(12) United States Patent
Hansen

(10) Patent No.: US 9,776,628 B2
(45) Date of Patent: Oct. 3, 2017

(54) METHOD OF STARTING AN INTERNAL COMBUSTION ENGINE OF A HYBRID VEHICLE

(71) Applicant: GM GLOBAL TECHNOLOGY OPERATIONS LLC, Detroit, MI (US)

(72) Inventor: R. Anthony Hansen, Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 86 days.

(21) Appl. No.: 15/014,554

(22) Filed: Feb. 3, 2016

(65) Prior Publication Data

US 2017/0217426 A1  Aug. 3, 2017

(51) Int. Cl.
*B60W 20/00* (2016.01)
*B60K 6/00* (2006.01)
*B60W 20/40* (2016.01)
*F02N 11/08* (2006.01)

(52) U.S. Cl.
CPC ............ *B60W 20/40* (2013.01); *F02N 11/08* (2013.01); *B60W 2510/0638* (2013.01); *B60W 2710/0666* (2013.01); *B60W 2710/083* (2013.01); *F02N 2200/022* (2013.01)

(58) Field of Classification Search
CPC .......... F02D 43/00; F02D 45/00; F02D 17/02; F02D 31/00
USPC ................ 701/113; 477/3; 180/65.23, 65.25; 123/435, 453, 491
See application file for complete search history.

(56) References Cited

U.S. PATENT DOCUMENTS

| | | | |
|---|---|---|---|
| 6,209,672 B1* | 4/2001 | Severinsky | B60K 6/442 180/65.23 |
| 8,387,730 B2* | 3/2013 | Bouchon | B60K 6/48 180/65.265 |
| 2001/0039230 A1* | 11/2001 | Severinsky | B60H 1/004 477/3 |
| 2002/0179348 A1* | 12/2002 | Tamai | F02D 41/062 180/65.25 |
| 2005/0279323 A1* | 12/2005 | Lewis | F01L 13/0005 123/321 |
| 2006/0254564 A1* | 11/2006 | Lewis | F01L 9/04 123/491 |
| 2008/0132378 A1* | 6/2008 | Bouchon | B60K 6/48 477/3 |
| 2009/0259391 A1* | 10/2009 | Ando | F02P 5/1506 701/113 |

* cited by examiner

Primary Examiner — Thomas G Black
Assistant Examiner — Wae Louie
(74) Attorney, Agent, or Firm — Quinn IP Law

(57) ABSTRACT

A method of automatically starting an internal combustion engine of a hybrid vehicle includes defining a rotational engine speed profile to represent a desired engine speed during a starting event with a hybrid system controller, and communicating the rotational engine speed profile to an engine controller. The internal combustion engine is rotated with an electric propulsion motor of the hybrid vehicle. A spark correction offset is calculated with the engine controller based on the rotational engine speed profile. The internal combustion engine is fired with the calculated spark correction offset for a pre-determined number of firing events, with the engine controller, as the rotational speed of the engine increases. The rotational speed of the internal combustion engine is controlled with the hybrid system controller after the pre-determined number of firing events.

20 Claims, 1 Drawing Sheet

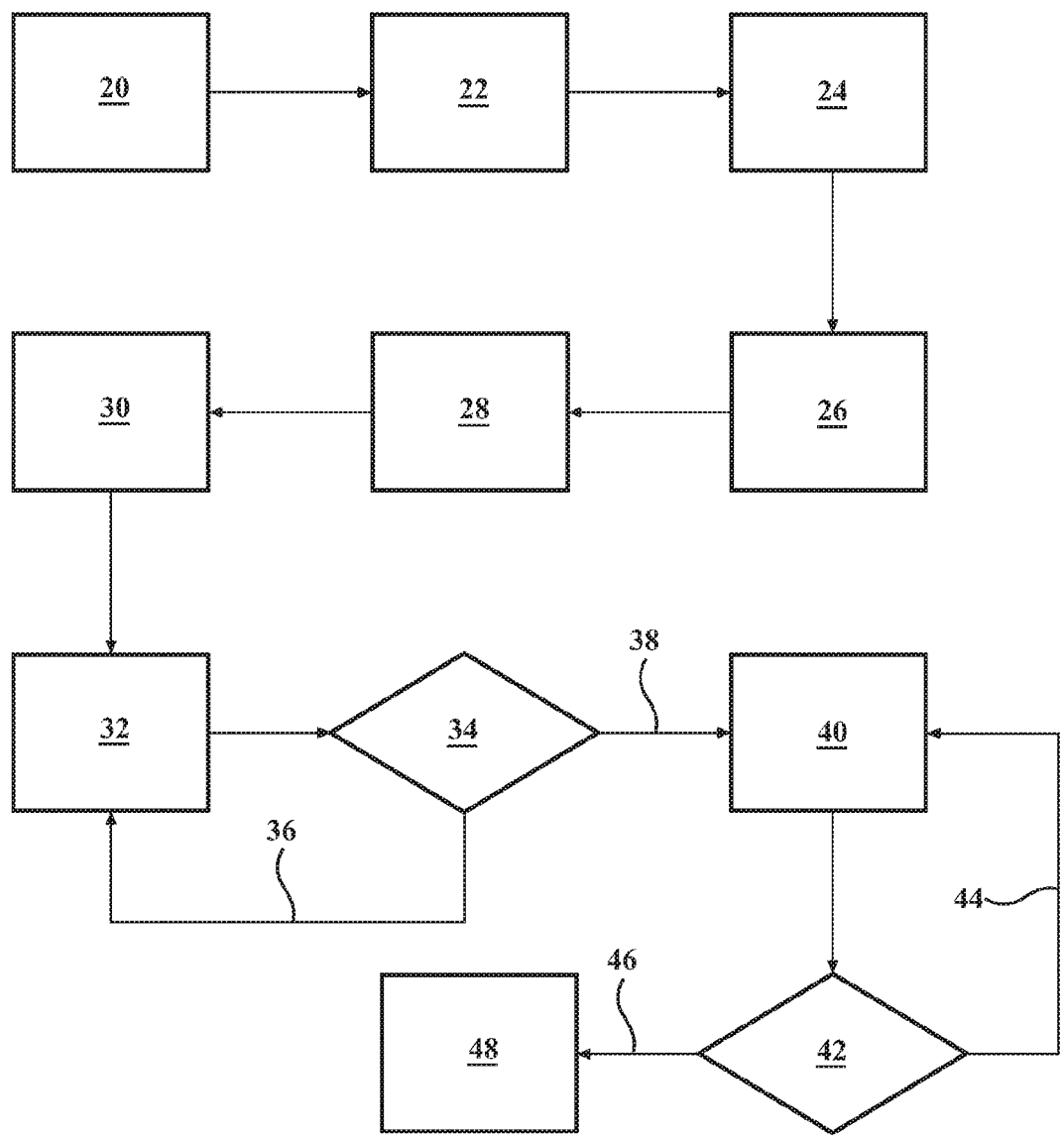

METHOD OF STARTING AN INTERNAL COMBUSTION ENGINE OF A HYBRID VEHICLE

TECHNICAL FIELD

The disclosure generally relates to a method of automatically starting an internal combustion engine of a hybrid vehicle.

BACKGROUND

Hybrid vehicles may include both an internal combustion engine and an electric motor. In some hybrid configurations, either the internal combustion engine or the electric motor, either individually or in combination, may be used to provide the propulsive power for the vehicle. During certain situations, when the internal combustion engine is disengaged, it becomes necessary to automatically start the internal combustion engine, such as to provide additional propulsive power or for regenerating an energy storage device, e.g., a battery. These situations are commonly referred to as auto-starts.

For a typical hybrid auto-start, a hybrid system controller controls a rotational speed of the internal combustion engine to increase the rotational speed of the engine up to a desired engine speed, based on a calculated rotational engine speed profile, after which the engine is fueled and fired to start torque production. However, auto-starts may be combustion assisted, in which case the engine is fueled and fired as soon as the electric motor begins to spin the internal combustion engine, and before the internal combustion engine is rotating at the desired engine speed. During combustion assisted auto-starts, an engine controller uses a flare control algorithm to control the rotational speed of the engine. The flare control algorithm uses a single calibration table to define the desired engine speed of the internal combustion engine. Accordingly, during combustion assisted auto-starts, the hybrid system controller and the engine controller each define different values for the desired engine speed of the internal combustion engine, thereby creating inefficiency in the system.

SUMMARY

A method of automatically starting an internal combustion engine of a hybrid vehicle is provided. The method includes defining a rotational engine speed profile to represent a desired engine speed during a starting event. The rotational engine speed profile is defined by a hybrid system controller, based on current operating conditions of the hybrid vehicle. The defined rotational engine speed profile is communicated from the hybrid system controller to an engine controller. The internal combustion engine is rotated with an electric propulsion motor of the hybrid vehicle, to increase a rotational speed of the internal combustion engine from an initial speed to the desired engine speed defined by the rotational engine speed profile. The rotational speed of the internal combustion engine is controlled by the engine controller. A spark correction offset is calculated with the engine controller based on a deviation between an actual rotational speed of the internal combustion engine and the rotational engine speed profile. The internal combustion engine is fired with the calculated spark correction offset for a pre-determined number of firing events, with the engine controller. The rotational speed of the internal combustion engine is controlled with the hybrid system controller after the pre-determined number of firing events.

A method of controlling a vehicle having an internal combustion engine controlled by an engine controller, and a hybrid propulsion system controlled by a hybrid system controller and including an electric propulsion motor, is also provided. The method includes initiating a combustion assisted auto start of the internal combustion engine. A rotational engine speed profile is defined to represent a desired engine speed during a starting event. The rotational engine speed profile is defined with the hybrid system controller, based on current operating conditions of the vehicle. The defined rotational engine speed profile is communicated from the hybrid system controller to the engine controller. The internal combustion engine is rotated with the electric propulsion motor of the hybrid vehicle, to increase a rotational speed of the internal combustion engine from an initial speed to the desired engine speed defined by the rotational engine speed profile. Torque from the electric propulsion motor for rotating the internal combustion engine is controlled with the hybrid system controller, based on the defined rotational engine speed profile. A spark correction offset is defined with a flare control algorithm of the engine controller. The flare control algorithm uses the defined rotational engine speed profile to calculate the spark correction offset. The internal combustion engine is fired with the calculated spark correction offset for a pre-determined number of firing events, with the engine controller, to control the rotational speed of the internal combustion engine.

Accordingly, the rotational engine speed profile that is calculated by the hybrid system controller is communicated to the engine controller, so that the engine controller may use the rotational engine speed profile to calculate the spark correction factor that is used by the flare control algorithm to control the rotational engine speed during the combustion assisted auto-start. In so doing, both the engine controller and the hybrid system controller target the same engine idle speed during the combustion assisted auto-start, thereby improving the efficiency of the vehicle during the combustion assisted auto-start.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a flowchart representing a method of starting an internal combustion engine of a hybrid vehicle during a combustion assisted auto-start.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout, a method of automatically starting an internal combustion engine of a hybrid vehicle with combustion assistance is generally described. The internal combustion engine of the hybrid vehicle may include any style and/or configuration of engine. An engine controller is connected to the internal combustion engine and is operable to control the operation of the internal combustion engine.

The engine controller may include a computer and/or processor, and include all software, hardware, memory, algorithms, connections, sensors, etc., necessary to manage and control the operation of the internal combustion engine. As such, the method described below may be embodied as one or more programs or algorithms operable on the engine controller. It should be appreciated that the engine controller may include any device capable of analyzing data from various sensors, comparing data, making the necessary decisions required to control the operation of the internal combustion engine, and executing the required tasks necessary to control the operation of the internal combustion engine.

The engine controller may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The engine controller includes tangible, non-transitory memory on which are recorded computer-executable instructions, including a flare control algorithm. The processor of the engine controller is configured for executing the flare control algorithm. The flare control algorithm implements a method of calculating a spark correction offset, and firing the engine with the spark correction offset to control the rotational speed of the internal combustion engine.

Hybrid vehicle further includes a hybrid propulsion system. The hybrid propulsion system includes an electric propulsion motor, and is controlled by a hybrid system controller. The hybrid system controller may include a computer and/or processor, and include all software, hardware, memory, algorithms, connections, sensors, etc., necessary to manage and control the operation of the hybrid propulsion system and/or the internal combustion engine. As such, the method described below may be embodied as one or more programs or algorithms operable on the hybrid system controller. It should be appreciated that the hybrid system controller may include any device capable of analyzing data from various sensors, comparing data, making the necessary decisions required to control the operation of the hybrid propulsion system and/or the internal combustion engine, and executing the required tasks necessary to control the operation of the hybrid propulsion system and/or the internal combustion engine. While described herein as being separate controllers, it should be appreciated that the engine controller and the hybrid system controller may be combined into a single control module that is operable to perform all of the functions of the individual controller, i.e., the engine controller and the hybrid system controller as described herein.

The hybrid system controller may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The hybrid system controller includes tangible, non-transitory memory on which are recorded computer-executable instructions, including an engine speed profile algorithm. The processor of the hybrid system controller is configured for executing the engine speed profile algorithm. The engine speed algorithm implements a method of defining a rotational engine speed profile for starting the internal combustion engine.

The method of automatically starting the internal combustion engine with combustion assistance is herein described below. The method includes initiating a combustion assisted auto start of the internal combustion engine. Initiating the combustion assisted auto start is generally indicated by box 20 in FIG. 1. As used herein, a "combustion assisted auto start" is defined as an automatic start of the internal combustion engine, i.e., a non-keyed start initiated by a vehicle controller, in which the internal combustion engine is automatically started by the hybrid system controller, and in which the internal combustion engine is fueled and fired as soon as the electric propulsion motor begins to spin or rotate the internal combustion engine to start it. The combustion assisted auto start may be initiated in response to many different driving situations. For example, the combustion assisted auto start may be initiated when launching from a stop light/sign, when necessary to charge the battery, when driver demand, e.g., an axle torque request, cannot be met by the electric propulsion motor alone, etc.

Once the hybrid system controller determines that the combustion assisted auto start should be initiated, the hybrid system controller communicates a command signal to the engine controller, which commands the engine controller to automatically start the internal combustion engine. Communicating the command signal is generally indicated by box 22 in FIG. 1. The command signal may be communicated between the hybrid system controller and the engine controller in any suitable manner, such as through a standard vehicle CAN bus or other suitable system.

In addition to sending the command signal to the engine controller, the hybrid system controller also defines a rotational engine speed profile, and communicates the defined rotational engine speed profile to the engine controller. Defining the rotational engine speed profile is generally indicated by box 24 in FIG. 1. Communicating the rotational engine speed profile to the engine controller is generally indicated by box 26 in FIG. 1. The rotational engine speed profile may be communicated between the hybrid system controller and the engine controller in any suitable manner, such as through a standard vehicle CAN bus or other suitable system.

The rotational engine speed profile represents a desired engine speed during the combustion assisted auto start. It should be appreciated that the desired engine speed for starting the internal combustion engine varies with changing conditions, such as a temperature of various vehicle systems. Accordingly, the hybrid system controller defines the rotational engine speed profile based on the current operating conditions of the vehicle. The current operating conditions of the hybrid vehicle may include but are not limited to, an ambient temperature, an electric propulsion motor torque limit, a battery power limit, or a clutch torque limit. Accordingly, the rotational engine speed profile represents the optimal path or increase in the rotational speed of the engine in order to increase the rotational speed of the engine to the optimal engine speed for starting the internal combustion engine for the specific, current operating conditions of the vehicle. The rotational engine speed profile varies the rotational speed of the internal combustion engine during the starting event to achieve the desired engine speed. Accordingly, it should be appreciated that the desired engine speed is not a constant rotational speed during each starting event, but rather varies or changes during each starting event, and is the end result that is achieved by the engine speed profile. Furthermore, it should be appreciated that the rotational engine speed profile is not constant between different starting events, but is defined for each starting event based on the specific operating conditions of the vehicle at that time.

Once the hybrid system controller has defined the rotational engine speed profile, the hybrid system controller then rotates or spins the internal combustion engine with the electric propulsion motor. The hybrid system controller rotates the internal combustion engine to increase a rotational speed of the internal combustion engine from an initial speed to the desired engine speed, which is defined by the rotational engine speed profile. Accordingly, the hybrid system controller is using torque from the electric propulsion motor to control the rotational speed of the internal combustion engine. The hybrid system controller controls torque from the electric propulsion motor that is used to rotate the internal combustion engine, to control the rotational speed of the internal combustion engine and achieve the desired engine speed, based on the defined rotational engine speed profile. The initial speed may include a speed of zero if the internal combustion engine is not rotating, but it should be appreciated that the internal combustion engine could have an initial rotational speed that is greater than zero, but less than the desired engine speed defined by the rotational engine speed profile.

At the same time that the hybrid system controller begins to rotate the internal combustion engine, and prior to the rotational speed of the internal combustion engine increasing to or achieving the desired engine speed defined by the rotational engine speed profile, the engine controller begins to fuel and fire the internal combustion engine, thereby establishing the combustion assisted start. The rotation and fueling of the internal combustion engine are generally indicated by box 28 in FIG. 1. The internal combustion engine is fueled by injecting a fuel/air mixture into each cylinder of the internal combustion engine as is known in the art. The internal combustion engine is fired by sending a spark to each cylinder of the internal combustion engine as each piston nears completion of its respective compression stroke as is known in the art.

While the hybrid system controller is using the electric propulsion motor to control the rotational speed of the internal combustion engine, the engine controller is using the flare control algorithm to also control the rotational speed of the internal combustion engine. Accordingly, because both the hybrid system controller and the engine controller are simultaneously operating to control the rotational speed of the engine during the combustion assisted auto start, it is important that both the hybrid system controller and the engine controller operate to control the rotational speed of the internal combustion engine to the same rotational speed, i.e., the same desired engine speed that is defined by the rotational engine speed profile.

As noted above, the engine controller uses the flare control algorithm to control the rotational speed of the internal combustion engine. The flare control algorithm adjusts the timing of the spark, either retarding or advancing the timing of the spark, to control the speed of the internal combustion engine. In order to do so, the flare control algorithm calculates a spark correction offset. As is known in the art, the spark correction offset is added to a base spark angle. Calculating the spark correction offset is generally indicated by box 30 in FIG. 1. The flare control algorithm uses the defined rotational engine speed profile, which was generated by the hybrid system controller and communicated to the engine controller, to calculate the spark correction offset. Accordingly, both the engine controller and the hybrid system controller are using the same rotational engine speed profile as the basis upon which to control the rotational speed of the internal combustion engine. This reduces conflicts and/or inefficiencies during the combustion assisted auto start that may be caused by both the hybrid system controller and the engine controller attempting to simultaneously control the rotational speed of the internal combustion engine.

As noted above, the rotational engine speed profile varies the desired engine speed during the starting event, such that the desired engine speed used by the engine controller to calculate the spark correction offset changes during the starting event. Accordingly, the spark correction offset is continuously calculated throughout a pre-defined number of firing events, as described in greater detail below. The flare control algorithm may calculate the spark correction offset based on a difference between a current rotational speed of the internal combustion engine and desired engine speed defined by the rotational engine speed profile.

The engine controller then fires the internal combustion engine with the calculated spark correction offset for a pre-determined number of firing events. Firing the internal combustion engine with the spark correction offset is generally indicated by box 32 in FIG. 1. It should be appreciated that the term "firing" is used herein to describe the process of sending a spark to the cylinder of the internal combustion engine, as the cylinder is being fueled, as that cylinder nears its respective top dead center position of its respective compression stroke to ignite the fuel/air mixture within the cylinder. A single firing event is defined herein as a singular firing of one individual cylinder. The internal combustion engine is fired with the calculated spark correction offset to control the rotational speed of the internal combustion engine. The firing of the internal combustion engine begins as soon as the internal combustion engine begins to rotate, and prior to the rotational speed of the internal combustion engine achieving the desired engine speed defined by the rotational engine speed profile.

In a keyed crank start, the internal combustion engine is generally allowed to flare, which means to overshoot the desired engine speed and then settle back down to the desired engine speed. This causes a disturbance that the driver may feel when the engine is started. For an auto start, that disturbance is not desirable. Therefore, the flare control algorithm is used to minimize the overshoot of the engine's speed above the desired engine speed so that this disturbance is not transmitted to the driver. The spark offset typically further retards the spark during flare control in order to reduce the amount of torque produced by the engine on a cylinder-by-cylinder basis until the flare control algorithm exits.

As noted above, the engine controller fires the internal combustion engine with the corrected spark offset for a pre-determined number of firing events. In order to track the number of firing events, the engine controller initiates a counter of the engine controller to count the occurrence of each firing event during the starting event. As described above, each time spark is introduced into each individual cylinder is counted as a single firing event. The pre-determined number of firing events may vary, depending upon the type, style, and configuration of the internal combustion engine. However, an exemplary value for the pre-determined number of firing events may be defined to include 24 different firing events per combustion assisted auto-start event. The counter increments the number of firing events counted during the combustion assisted auto start, and saves that value in the memory of the engine controller. The engine controller then compares the number of firing event occurrences counted by the counter to the pre-determined number of firing events to determine if the number of firing events has reached the pre-defined number or not. Determining if the number of firing events has reached the pre-defined number is generally indicated by box 34 in FIG. 1. If the engine controller determines that the number of firing events is less than the pre-defined number, generally indicated at 36, then the engine controller continues to fire the internal combustion engine with the spark correction offset.

Once the engine controller determines that the number of firing events is equal to the pre-determined number of firing events, generally indicated at 38, then the engine controller ceases or stops the firing of the internal combustion engine with the calculated spark correction offset, and begins firing the internal combustion engine without the calculated spark correction offset. The cessation of firing with the spark correction offset and the beginning of firing without the spark correction offset are generally indicated by box 40 in FIG. 1. Additionally, when the engine controller determines that the number of firing events is equal to the pre-determined number of firing events, the engine controller switches control of the rotational speed of the internal combustion engine back to the hybrid system controller, so that only the hybrid system controller is actively operating to control the rotational speed of the internal combustion engine during the remainder of the combustion assisted auto-start. As described above, the hybrid system controller controls the rotational speed of the internal combustion engine during the combustion assisted auto start by controlling the torque from the electric propulsion motor being used to rotate or spin the internal combustion engine.

The hybrid system controller monitors the operation of the internal combustion engine in order to determine if the internal combustion engine is producing torque, thereby indicating that the internal combustion engine is running. Determining if the internal combustion engine is producing torque is generally indicated by box 42 in FIG. 1. If the hybrid system controller determines that the internal combustion engine is not yet producing torque, generally indicated at 44, then the hybrid system controller continues to rotate and fire the internal combustion engine without the spark correction offset. Once the hybrid system controller determines that the internal combustion engine is producing torque, generally indicated at 46, then the hybrid system controller stops rotating the internal combustion engine with the electric propulsion motor, and signals the engine controller to take over active control of the internal combustion engine. The stoppage of rotating the internal combustion engine with the electric propulsion motor is generally indicated by box 48 in FIG. 1.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of automatically starting an internal combustion engine of a hybrid vehicle, the method comprising:
   defining a rotational engine speed profile to represent a desired engine speed during a starting event, with a hybrid system controller, based on current operating conditions of the hybrid vehicle;
   communicating the defined rotational engine speed profile from the hybrid system controller to an engine controller;
   rotating the internal combustion engine with an electric propulsion motor of the hybrid vehicle, to increase a rotational speed of the internal combustion engine from an initial speed to the desired engine speed defined by the rotational engine speed profile, wherein the rotational speed of the internal combustion engine is controlled by the engine controller;
   calculating a spark correction offset with the engine controller based on the rotational engine speed profile;
   firing the internal combustion engine with the calculated spark correction offset for a pre-determined number of firing events, with the engine controller; and
   controlling the rotational speed of the internal combustion engine with the hybrid system controller after the pre-determined number of firing events.

2. The method set forth in claim 1 further comprising controlling torque from the electric propulsion motor for rotating the internal combustion engine, with the hybrid system controller, based on the defined rotational engine speed profile.

3. The method set forth in claim 1 wherein the rotational engine speed profile varies the desired engine speed during the starting event, such that the desired engine speed used by the engine controller to calculate the spark correction offset changes during the starting event.

4. The method set forth in claim 1 further comprising initiating a counter of the engine controller to count the occurrence of each firing event during the starting event.

5. The method set forth in claim 4 further comprising comparing the number of firing event occurrences counted by the counter to the pre-determined number of firing events.

6. The method set forth in claim 5 further comprising switching rotational speed control of the internal combustion engine from the engine controller to the hybrid system controller when the number of firing event occurrences counted by the counter is equal to the pre-determined number of firing events.

7. The method set forth in claim 5 further comprising ceasing the firing of the internal combustion engine with the calculated spark correction offset and beginning firing the internal combustion engine without the calculated spark correction offset when the number of firing event occurrences counted by the counter is equal to the pre-determined number of firing events.

8. The method set forth in claim 1 further comprising determining if the internal combustion engine is producing torque with the hybrid system controller.

9. The method set forth in claim 8 further comprising stopping rotating the internal combustion engine with the electric propulsion motor when the hybrid system controller determines that the internal combustion engine is producing torque.

10. The method set forth in claim 8 further comprising stopping rotating the internal combustion engine with the electric propulsion motor when the hybrid system controller determines that the internal combustion engine is producing torque.

11. The method set forth in claim 1 further comprising communicating a command signal from the hybrid system controller to the engine controller to command the engine controller to automatically start the internal combustion engine.

12. The method set forth in claim 1 wherein calculating the spark correction offset based on the rotational engine speed profile is further defined as calculating the spark correction offset based on a difference between a current rotational speed of the internal combustion engine and the rotational engine speed profile.

13. The method set forth in claim 1 wherein the current operating conditions of the hybrid vehicle include an ambient temperature, an electric propulsion motor torque limit, a battery power limit, or a clutch torque limit.

14. The method set forth in claim 1 further comprising determining if the internal combustion engine is producing torque with the hybrid system controller.

15. A method of controlling a vehicle having an internal combustion engine controlled by an engine controller, and a hybrid propulsion system controlled by a hybrid system controller and including an electric propulsion motor, the method comprising:
    initiating a combustion assisted auto start of the internal combustion engine;
    defining a rotational engine speed profile to represent a desired engine speed during a starting event, with the hybrid system controller, based on current operating conditions of the vehicle;
    communicating the defined rotational engine speed profile from the hybrid system controller to the engine controller;
    rotating the internal combustion engine with the electric propulsion motor of the hybrid vehicle, to increase a rotational speed of the internal combustion engine from an initial speed to the desired engine speed defined by the rotational engine speed profile;
    controlling torque from the electric propulsion motor for rotating the internal combustion engine, with the hybrid system controller, based on the defined rotational engine speed profile;
    calculating a spark correction offset with a flare control algorithm of the engine controller, wherein the flare control algorithm uses the defined rotational engine speed profile to calculate a spark correction offset; and
    firing the internal combustion engine with the calculated spark correction offset for a pre-determined number of firing events, with the engine controller, to control the rotational speed of the internal combustion engine.

16. The method set forth in claim 15 further comprising controlling the rotational speed of the internal combustion engine with the hybrid system controller after the pre-determined number of firing events.

17. The method set forth in claim 15 further comprising initiating a counter of the engine controller to count the occurrence of each firing event during the starting event.

18. The method set forth in claim 17 further comprising switching rotational speed control of the internal combustion engine from the engine controller to the hybrid system controller when the number of firing event occurrences counted by the counter is equal to the pre-determined number of firing events.

19. The method set forth in claim 17 further comprising stopping firing the internal combustion engine with the calculated spark correction offset and beginning firing the internal combustion engine without the calculated spark correction offset when the number of firing event occurrences counted by the counter is equal to the pre-determined number of firing events.

20. The method set forth in claim 17 wherein calculating the spark correction offset based on the rotational engine speed profile is further defined as calculating the spark correction offset based on a difference between a current rotational speed of the internal combustion engine and the rotational engine speed profile.

* * * * *